US011553321B2

(12) United States Patent
Martin

(10) Patent No.: US 11,553,321 B2
(45) Date of Patent: Jan. 10, 2023

(54) APPARATUS AND METHOD FOR DISPATCHING A TOW TRUCK IN RESPONSE TO A ROADWAY EMERGENCY

(71) Applicant: RAPIDSOS, INC., New York, NY (US)

(72) Inventor: Michael John Martin, Long Island, NY (US)

(73) Assignee: RAPIDSOS, INC., New York, NY (US)

( * ) Notice: Subject to any disclaimer, the term of this patent is extended or adjusted under 35 U.S.C. 154(b) by 29 days.

(21) Appl. No.: 16/912,416

(22) Filed: Jun. 25, 2020

(65) Prior Publication Data

US 2021/0006960 A1   Jan. 7, 2021

Related U.S. Application Data

(60) Provisional application No. 62/870,995, filed on Jul. 5, 2019.

(51) Int. Cl.
*H04W 4/90* (2018.01)
*B60R 21/0136* (2006.01)
*G01C 21/16* (2006.01)
*H04W 4/029* (2018.01)
*H04W 4/40* (2018.01)
*B60R 21/0134* (2006.01)

(52) U.S. Cl.
CPC .......... *H04W 4/90* (2018.02); *B60R 21/0134* (2013.01); *B60R 21/0136* (2013.01); *G01C 21/16* (2013.01); *H04W 4/029* (2018.02); *H04W 4/40* (2018.02)

(58) Field of Classification Search
CPC ......... H04W 4/90; H04W 4/029; H04W 4/40; H04W 4/12; H04W 4/44; B60R 21/0134; B60R 21/0136; B60R 21/01; G01C 21/16; G08G 1/0112; G08G 1/0116; G08G 1/0133; G08G 1/205
See application file for complete search history.

(56) References Cited

U.S. PATENT DOCUMENTS

| | | | |
|---|---|---|---|
| 9,019,092 B1* | 4/2015 | Brandmaier | B60R 21/0136 340/436 |
| 9,628,975 B1* | 4/2017 | Watkins | H04W 4/027 |
| 9,672,719 B1* | 6/2017 | Hollenstain | G08B 21/187 |
| 2011/0287733 A1* | 11/2011 | Cepuran | H04M 11/04 455/404.1 |
| 2017/0046216 A1* | 2/2017 | Stenneth | G08B 25/007 |
| 2017/0101054 A1* | 4/2017 | Dusane | G08G 1/205 |
| 2017/0191843 A1* | 7/2017 | Yadav | H04W 4/02 |
| 2017/0325056 A1* | 11/2017 | Mehta | H04W 4/024 |
| 2018/0218549 A1* | 8/2018 | Wahba | B60R 21/00 |

(Continued)

*Primary Examiner* — Marcus Hammonds
(74) *Attorney, Agent, or Firm* — Cygan Law Offices PC; Joseph T. Cygan

(57) ABSTRACT

A method of operating an emergency services system entity is disclosed. The method includes receiving, by the emergency services system entity, data from a plurality of data sources; determining that a vehicle collision occurred based on the received data; determining a vehicle collision location; and sending a tow truck dispatch request to a plurality of tow truck dispatch systems in response to determining that a vehicle collision occurred, where the request includes the vehicle collision location.

20 Claims, 12 Drawing Sheets

(56) References Cited

U.S. PATENT DOCUMENTS

2019/0149974 A1* 5/2019 Gazdziak ................ H04W 4/90
                                                        455/404.1
2019/0208392 A1* 7/2019 Merjanian .......... G01C 21/3697
2020/0160066 A1* 5/2020 Tani ....................... H04N 7/181

* cited by examiner

APPARATUS AND METHOD FOR DISPATCHING A TOW TRUCK IN RESPONSE TO A ROADWAY EMERGENCY

CROSS-REFERENCE TO RELATED APPLICATIONS

The present application claims priority to U.S. Provisional Patent Application No. 62/870,995, filed Jul. 5, 2019, entitled "APPARATUS AND METHOD FOR DISPATCHING A TOW TRUCK IN RESPONSE TO A ROADWAY EMERGENCY" which is hereby incorporated by reference herein in its entirety, and which is assigned to the same assignee as the present application.

FIELD OF THE DISCLOSURE

The present disclosure relates generally to emergency calls, next generation E911 emergency call systems, and more particularly to providing data to Public Safety Answering Points (PSAPs), apparatuses and methods.

BACKGROUND

First responders such as police, fire department personnel and paramedics, are often faced with roadside emergencies in which a vehicle collision has occurred, or other situations in which a vehicle has stalled and is no longer operative, or situations where the vehicle must be abandoned. In these situations, the vehicle drivers may not be able to find a tow truck to remove their vehicle from the road or may not be in a condition to do so. Usually law enforcement officials, or other first responders must place a phone call to obtain a tow truck to clear the road after such emergency situations. However, because the first responders are extremely busy managing the emergency response, finding a tow truck is a poor use of their time and resources.

DETAILED DESCRIPTION

Figure 1:
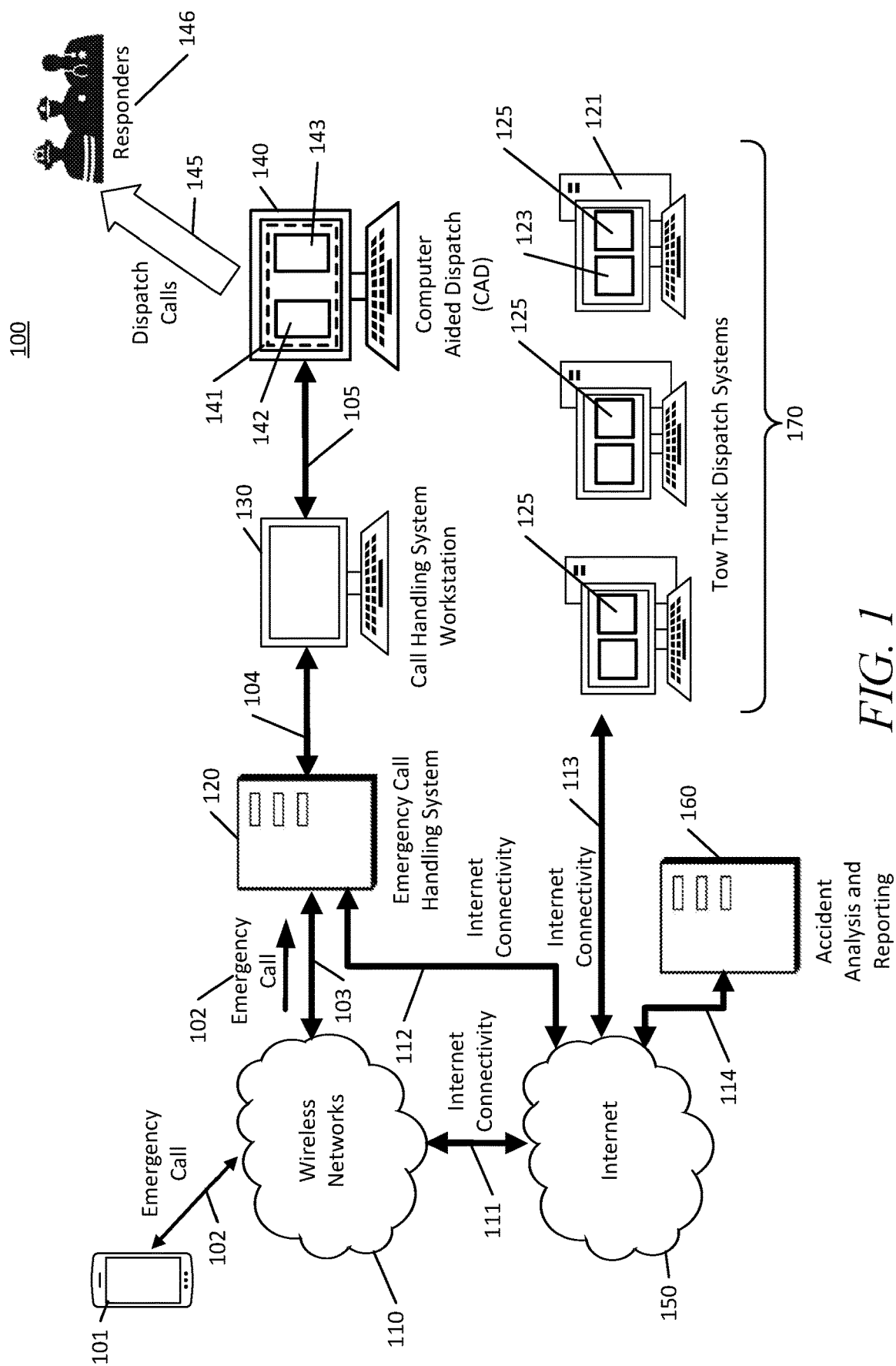
FIG. 1 is a block diagram of an emergency services system that includes an accident analysis and reporting (AAR) system in accordance with various embodiments that communicates with an emergency network such as a public safety answering point (PSAP).

Briefly, the present disclosure provides an apparatus that is operative to communicate with tow truck dispatch systems to dispatch one or more tow trucks in response to, among other things, detection of a collision indicator in data received from a variety of sources. In one example, a tow truck may be dispatched in response to a threshold of emergency calls occurring within a given geospatial and temporal (i.e. time interval) span. By receiving data from various data sources and analyzing the data for collision indicators, the apparatus is operative to determine that a vehicle collision has occurred and proactively dispatch a tow truck to the accident scene even without an emergency call having been made. Other features include sending enhanced or supplemental incident information to an emergency network such as a PSAP.

The present disclosure provides a method of operating an emergency services system entity, that includes receiving, by the entity, data from a plurality of data sources; determining that a vehicle collision occurred based on the received data; determining a vehicle collision location; and sending a tow truck dispatch request to a plurality of tow truck dispatch systems in response to determining that a vehicle collision occurred. The request includes the vehicle collision location.

The method may further include: receiving, by the emergency services system entity, location data for a plurality of emergency calls; providing location information to an emergency network, such as a PSAP, in response to receiving the location data; monitoring the location data for call clusters based on location proximity and time; and determining that a vehicle collision occurred based on determining that the calls of a call cluster originated in proximity to a roadway. The method may further include: receiving, by the entity, inertial measurement unit (IMU) data as a portion of the data received from the plurality of data sources; determining that a vehicle collision occurred based on at least one of change in acceleration, change in velocity or change in position based on the IMU data; and identifying the location of the IMU data source as the vehicle collision location. The method may further include: receiving, by the entity, connected vehicle data as a portion of the data received from the plurality of data sources; determining that a vehicle collision occurred based on at least one collision indicator included in the connected vehicle data; and identifying the location of the connected vehicle as the vehicle collision location. The method may further include: receiving, by the entity, traffic sensor data as a portion of the data received from the plurality of data sources; determining that a vehicle collision occurred based on at least one collision indicator included in the traffic sensor data; and identifying the location of the connected vehicle as the traffic sensor location. The method may further include: receiving, by the entity, roadway camera data as a portion of the data received from the plurality of data sources; determining that a vehicle collision occurred based on at least one collision indicator included in the roadway camera data; and identifying the location of the connected vehicle as the roadway camera location. The method may further include: determining at least one collision indicator based on data from one of the plurality of data sources; comparing other data source data to identify correlated data; and determining a severity level for a collision based on the at least one collision indicator and the correlated data. The method may further include: searching social media feed data for related information in response to determining that a vehicle collision occurred based on the received data. The method may further include: receiving an acknowledgment from a tow truck dispatch system in response to sending the tow truck dispatch request; and notifying the emergency network, such as a public safety answering point, that a tow truck has been dispatched to the vehicle collision location.

The present disclosure also provides an emergency services system entity, that includes an emergency assessment engine, operative to: receive data from a plurality of data sources; and determine that a vehicle collision occurred based on the received data; a location determination engine, operatively coupled to the emergency assessment engine, operative to determine a vehicle collision location; and a tow truck dispatch system interface operatively coupled to the location determination engine and to the emergency assessment engine. The tow truck dispatch system interface is operative to send a tow truck dispatch request to a plurality of tow truck dispatch systems in response to the emergency assessment engine determining that a vehicle collision occurred. The request includes the vehicle collision location.

The emergency services system entity may further include a call cluster analysis engine, operatively coupled to the emergency assessment engine and to the location determination engine. The call cluster analysis engine operative to: monitor location data sent to the location determination engine for call clusters based on location proximity and time; and determine that a vehicle collision occurred based on determining that the calls of a call cluster originated in proximity to a roadway. The location determination engine may be further operative to: receive the location data for a plurality of emergency calls; and provide location information to an emergency network in response to receiving the location data.

The emergency services system entity may further include an inertial measurement unit (IMU) and vehicle data analysis engine, operatively coupled to the emergency assessment engine and to the location determination engine. The IMU and vehicle data analysis engine is operative to: receive IMU data from a plurality of mobile devices and vehicles; determine that a vehicle collision occurred based on at least one of change in acceleration, change in velocity or change in position based on the IMU data. The location determination engine may be further operative to identify the location of a mobile device that sent the IMU data as the vehicle collision location.

The IMU and vehicle data analysis engine may be further operative to: receive connected vehicle data from a plurality of connected vehicles; and determine that a vehicle collision occurred based on at least one collision indicator included in the connected vehicle data. The location determination engine may be further operative to identify the location of the connected vehicle as the vehicle collision location.

The emergency services system entity may further include a traffic sensor data analysis engine, operatively coupled to the emergency assessment engine and to the location determination engine. The traffic sensor data analysis engine is operative to: receive traffic sensor data from a plurality of traffic sensors; determine that a vehicle collision occurred based on at least one collision indicator included in the traffic sensor data; and identify the location of the vehicle collision as the traffic sensor location.

The emergency services system entity may further include: an image analysis engine, operatively coupled to the emergency assessment engine and to the location determination engine. The image analysis engine is operative to: receive roadway camera data from a plurality of roadway cameras; determine that a vehicle collision occurred based on at least one collision indicator included in the roadway camera data; and identify the location of the vehicle collision as the roadway camera location.

The emergency assessment engine may be further operative to: determine at least one collision indicator based on data from one of the plurality of data sources; compare other data source data to identify correlated data; and determine a severity level for a vehicle collision based on the at least one collision indicator and the correlated data.

The emergency services system entity may further include a social media context engine, operatively coupled to the emergency assessment engine and to the location determination engine. The social media context engine is operative to search social media feed data for related information in response to determining that a vehicle collision occurred based on the received data.

The emergency services system entity may further include: a tow truck dispatch system interface, operatively coupled to the emergency assessment engine and to the location determination engine. The tow truck dispatch system interface is operative to: receive an acknowledgment from a tow truck dispatch system in response to sending the tow truck dispatch request; and notify an emergency network, such as a public safety answering point, that a tow truck has been dispatched to the vehicle collision location.

Turning now to the drawings wherein like numerals represent like components, FIG. 1 illustrates an emergency services system 100 that communicates with an emergency network such as a public safety answering point (PSAP). The PSAP, which may also be referred to an emergency dispatch center, includes an emergency call handling system 120 which is operatively coupled to a PSTN (public switched telephone network) and various wireless networks 110 via a backhaul connection 103. The emergency call handling system 120 is operative to receive an emergency call 102, for example, from a mobile device 101 that is operatively coupled wirelessly to one of the various wireless networks 110 as well as emergency calls from landline phones connected to the PSTN. The emergency call handling system 120 is further operatively coupled via a connection 104, which may be an Ethernet connection, to a call handling system workstation 130, at which emergency services personnel may receive the emergency call 102 and speak with the caller if possible. However, depending upon the nature of the emergency, the caller may not be able to speak due to injuries, or other exigent circumstances.

The term "emergency call" as used herein refers to a communication relating to an emergency or non-emergency situation. The communication may be made from a mobile device to an emergency network, such as a PSAP. An emergency call may be an emergency request for assistance, where the request is associated with an emergency situation, or may be associated with a non-emergency situation. An emergency call may be a communication initiated by a mobile device user using the native dialer of the mobile device and may be associated with the mobile device making the call. However, an emergency call may also be associated with a mobile device not making the call such as relates to a proxy request made on behalf of a second device and/or a member device in a group of devices. As used herein, an emergency call is "associated" with a device or user when the emergency call relates to an emergency or non-emergency situation involving the device or user.

An emergency call may be an emergency alert where the emergency alert may have data associated with a mobile device or otherwise associated with a mobile device user. An emergency alert may also have data associated with a mobile device sending the alert or another device. For example, an emergency alert may have data associated with a mobile device, such as current and/or past location data, or current and/or past health data associated with the user of a mobile device. An emergency alert may be sent using for example, a Short Message Service (SMS) text message, a Multimedia Messaging Service (MMS) message, an e-mail message, an Instant Messaging (IM) message, a push notification, an alarm signal, a message delivered through an internet enabled communication service, such as WhatsApp and Facebook Messenger, via an API call or HTTP post, etc. An emergency alert may be sent and/or received separately from data associated with a mobile device.

The call handling system workstation 130 is further operatively coupled to a computer aided dispatch (CAD) system 140 via a connection 105, which may also be an Ethernet connection. The CAD system 140 includes one or more processors that are operative to execute one or more emergency services related applications. The CAD system 140 includes a display operative to provide one or more graphical user interfaces (GUIs) 141 related to the emergency services related applications. For example, one GUI 142 may be related to a location emergency services application and GUI 143 may be related to a tow truck dispatch emergency services application in accordance with various embodiments. Emergency services personnel may receive appropriate emergency services information via the GUI 142 and GUI 143, and other GUIs, and place dispatch calls 145 to emergency responders 146 accordingly. The GUI 142 and GUI 143 may be provided as a web browser interface (such as a cloud-based application interface), or via a web browser plug-in, or may be associated with applications running on the machine on which they are displayed, or by any other software implementation mechanism.

The various wireless networks 110 are operatively coupled to the Internet 150 via Internet connectivity 111 and provide Internet connections to the various mobile devices, such as mobile device 101, that are connected to the various wireless networks 110. The emergency call handling system 120 is also connected to the Internet 150 via Internet connectivity 112.

In accordance with various embodiments, an accident analysis and reporting (AAR) system 160 is operatively coupled to the Internet 150 with Internet connectivity 114 and is operative to receive data from various data sources including, but not limited to, mobile devices such as mobile device 101, the wireless networks 110 and other sources, etc. In some embodiments, the AAR system 160 may be collocated or integrated with the PSAP. Therefore, the AAR system 160 may be considered to be an emergency services system 100 entity or otherwise a type of apparatus. In other implementations, the AAR system 160 communicates with an emergency network such as a PSAP, and with various tow truck dispatch systems 170 as a Software-as-a-Service (SaaS) application that is accessed via a graphical user interface provided via a web browser. Therefore, the GUI 142, GUI 143 and GUI 125 may be provided via web browsers in communication with an SaaS application executing on a processor/server of AAR system 160. The AAR system 160 is operative to send data to the CAD system 140 via the Internet 150 and Internet connectivity 112 to the PSAP. Various tow truck dispatch systems 170 are operatively coupled to the Internet 150 via their respective Internet connectivity 113 which may be wired connections, wireless connections, or combinations of both. Each of the tow truck dispatch systems 170 includes a dispatch station 121 which includes one or more processors operative to execute emergency services software and to display one of more GUIs associated with the emergency services software. An emergency services dispatch application, such as for example a fleet management software or other fleet dispatch software, provides an emergency tow truck dispatch GUI 123 which provides information to tow truck dispatch personnel. The GUI 125, which may be accessed via a web browser, is operatively coupled to the AAR system 160 via an IP connection and may be implemented via one or more web socket connections. Among other features of the AAR system 160, the AAR system 160 is operative to communicate with the tow truck dispatch systems 170 to dispatch one or more tow trucks in response to a threshold of emergency calls occurring within a given geospatial and temporal (i.e. time interval) span. The GUI 125 may be operative to communicate with the tow truck dispatch software or fleet management software executing on each dispatch station 121 via application programming interfaces (APIs) that enable the communication and exchange of data between the applications.

Figure 2:
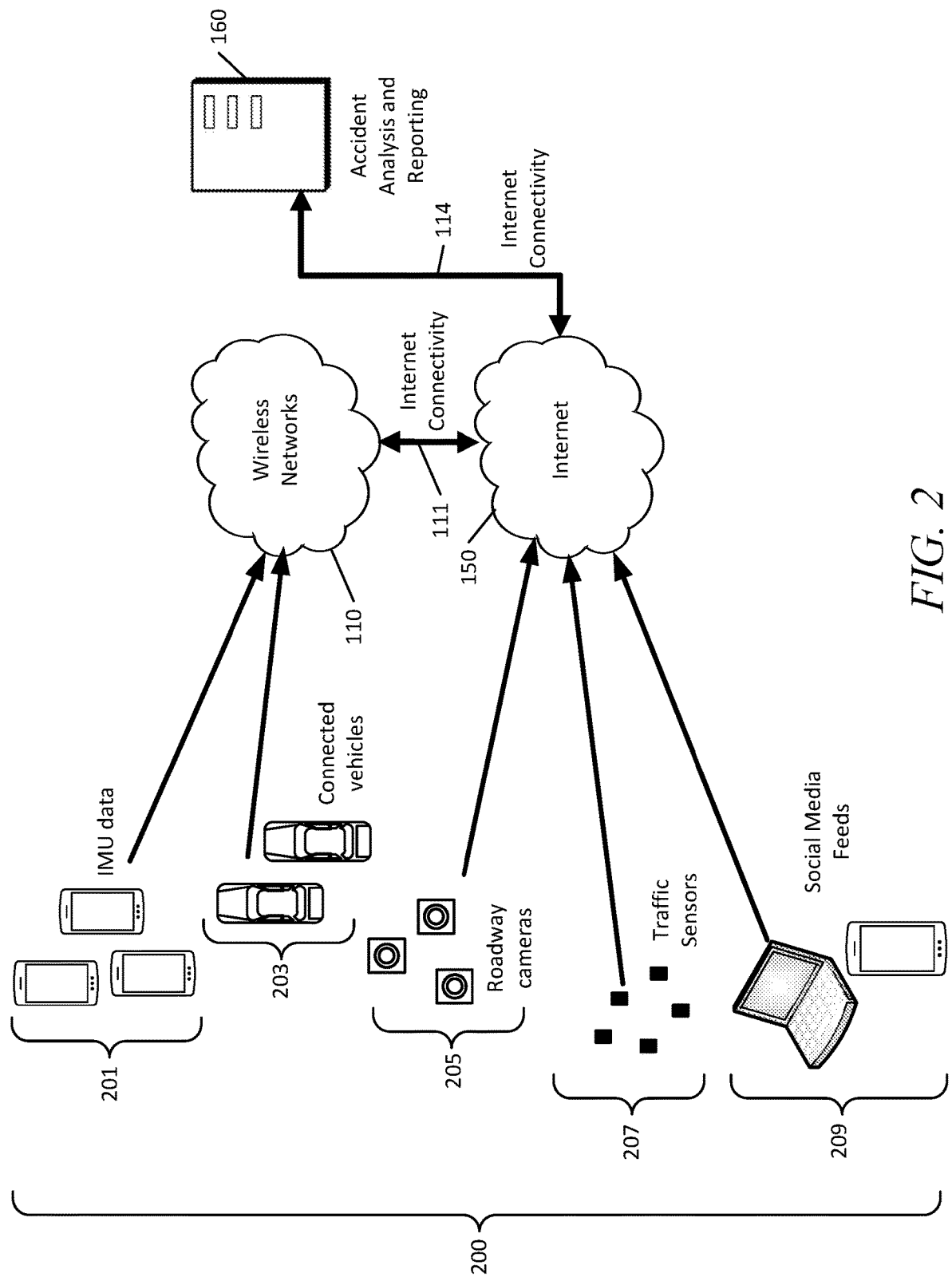
FIG. 2 is a block diagram that provides details on the various data sources from which the AAR system obtains data in accordance with the embodiments.

FIG. 2 is a block diagram that provides details on the various data sources 200 from which the AAR system 160 obtains data. The data sources 200 include intrinsic and extrinsic data sources such as, but not limited to, mobile device IMU data 201 (inertial measurement unit), connected vehicle data 203, roadway camera data 205, traffic sensor data 207 and social media feeds 209. An intrinsic data source refers to data sources that may be generated by a roadside emergency such as mobile devices present in a vehicle or connected vehicles when the vehicle is involved in a collision or in taking abrupt, sudden evasive action, to avoid collision. Extrinsic data sources are external such as, but not limited to, roadway camera data 205, traffic sensor data 207 and social media feeds 209. All of the data sources 200 are operative to communicate with the Internet 150 and the AAR system 160 is operative to receive data from each of the data sources 200 from the Internet 150 via Internet connectivity 114. For example, mobile devices and connected vehicles obtain Internet connections via a respective wireless network of the wireless networks 110, which in turn provide Internet connectivity 111. Roadway cameras and traffic sensors are operatively coupled to the Internet 150 and may be coupled via backhaul wired connections or may be wirelessly coupled. Social media feeds 209, which may include information originating from a variety of devices such as mobile devices, laptops, desktop computers etc., may be obtained from the social media source which for example is accessed via a website viewable and readable over the Internet 150.

Figure 3:
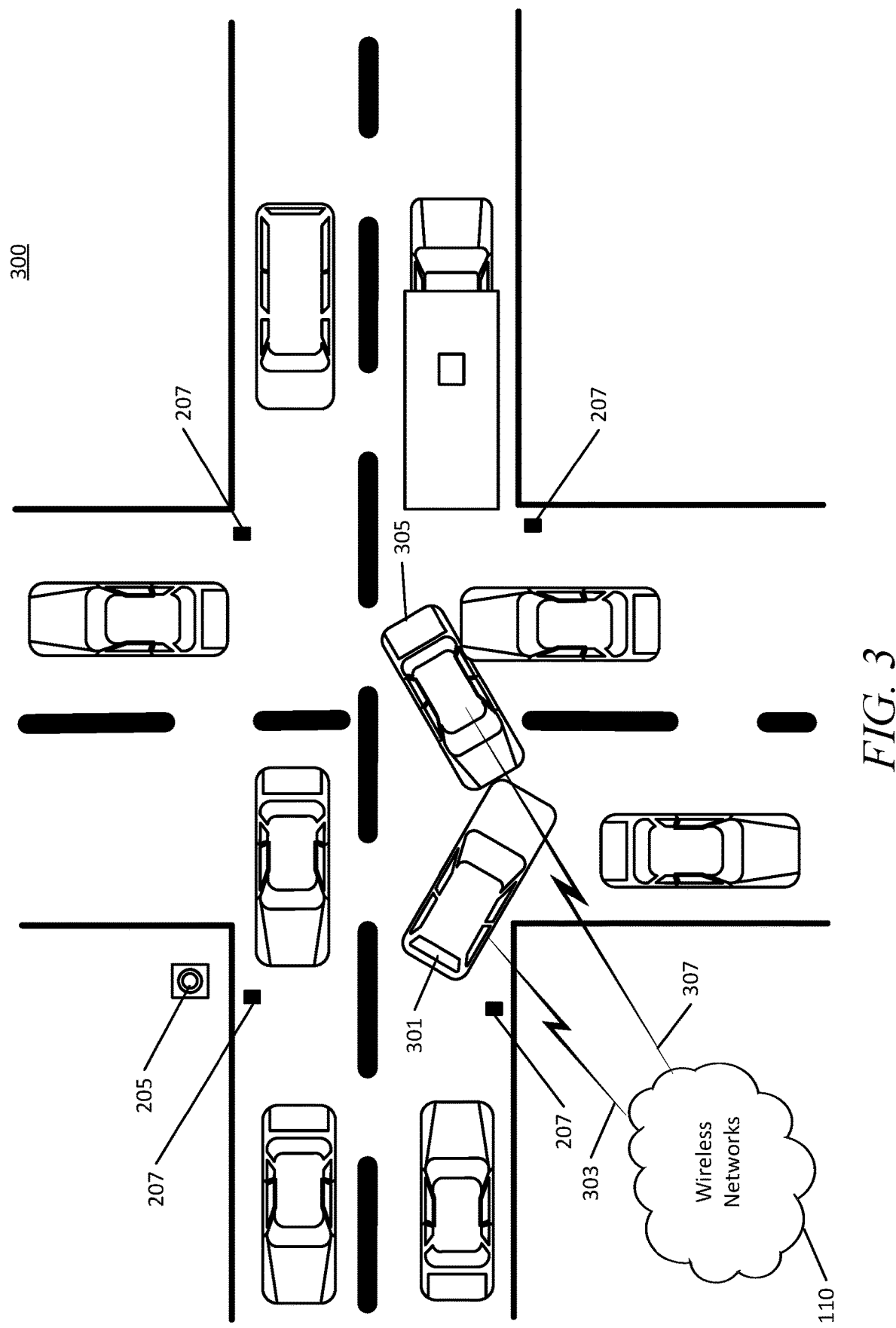
FIG. 3 is a traffic diagram showing an example of data being sent to the AAR system in accordance with some embodiments.

An example of how and when the data sources 200 interact with the AAR system 160 is illustrated in FIG. 3. FIG. 3 is a traffic diagram 300 showing an example of data being sent to the AAR system 160. In FIG. 3, a first vehicle 301 and second vehicle 305 are engaged in a collision. In this example, both vehicles are connected vehicles and send data to respective wireless networks 110. For example, the first vehicle 301 sends connected vehicle data 203 (i.e.

collision data) over a first wireless connection 303 and the second vehicle 305 sends connected vehicle data 203 over a second wireless connection 307. Because a third vehicle 309 is not a connected vehicle, it cannot send any connected vehicle data. However, because the driver has a mobile device 311, the mobile device 311 sends mobile device IMU data 201 related to the incident over wireless connection 313. Additionally, an Internet connected roadway camera sends roadway camera data 205 and a cluster of traffic sensors sends traffic sensor data 207 via the Internet 150.

The term "vehicle collision" as used herein refers to an event involving a vehicle relating to an emergency or non-emergency situation. A vehicle collision may involve more than one vehicle. For example, a vehicle collision may involve two or more vehicles in contact with one another, such as in the example illustrated by the example traffic diagram of FIG. 3. In another example, a vehicle collision may involve two or more vehicles that are not in contact with one another, such as for example, two or more vehicles sliding into a roadside ditch due to icy road conditions. A vehicle collision may involve one vehicle. For example, a vehicle collision may involve one vehicle in contact with an object that is not another vehicle, such as for example where a vehicle has come into contact with a tree, road sign, overpass, divider, nails in the road which cause a flat tire, etc., or where a vehicle may be in contact with the road such as in the case of an overturned vehicle which has turned on to its side or roof. In another example, a vehicle collision may involve one vehicle that is not in contact with another object such as where a vehicle has gone off-road, stalled, caught fire, etc.

Figure 4:
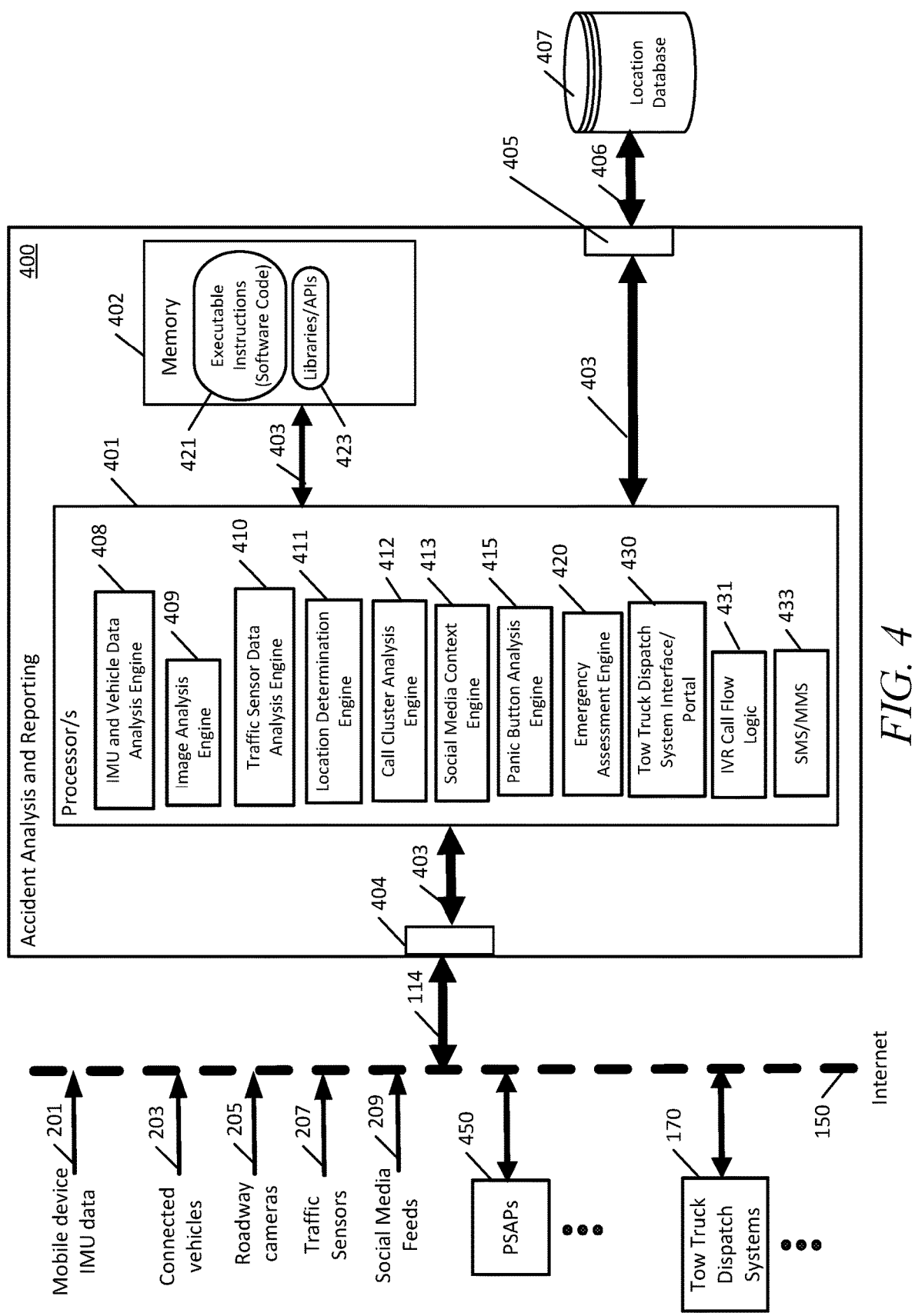
FIG. 4 is a block diagram that provides details of the AAR system in accordance with the embodiments.

FIG. 4 is a block diagram that provides details of an example AAR system 400 in accordance with some example embodiments. In accordance with the example embodiments, the AAR system 400 is operative to utilize intrinsic data and extrinsic data to detect that a roadway emergency has occurred, and to engage in various actions based on the nature of the roadway emergency using various practical applications that are assistive to emergency first responders. The AAR system 400 is further operative to utilize intrinsic data and extrinsic data to determine the severity of the emergency in order to determine the various actions based on the severity determination.

In FIG. 4, the example AAR system 400 includes one or more processors 401 and a memory 402 operatively coupled to the processors 401 via an internal communication bus 403. A network interface 404 is operatively coupled to the one or more processors via the internal communication bus 403 and provides Internet connectivity 114. In some embodiments, the example AAR system 400 may be operatively coupled to a location database 407 via another interface 405 and a database communication protocol 406.

As used herein, components may be "operatively coupled" when information can be sent between such two components, even though there may be one or more intermediate or intervening components between, or along the connection path. Therefore, any of the various components connected to the internal communication bus 403 may be understood herein to be operatively coupled to the one or more processors 401 or to each other where appropriate. Operative coupling may also exist between engines, system interfaces or components implemented as software or firmware executing on a processor and such "software coupling" may be implemented using libraries 423 (i.e. application programming interfaces (APIs)) or other software interfacing techniques as appropriate. Such libraries or APIs provide operative coupling between various software implemented engines in FIG. 4.

The one or more processors 401 are operative to execute software code, or "executable instructions" 421 which may be stored in memory 402, such that the one or more processors 401 are operative to implement an operating system, an IMU and vehicle data analysis engine 408; an image analysis engine 409; a traffic sensor data analysis engine 410; a location determination engine 411; an emergency call cluster analysis engine 412; a social media context engine 413; a panic button analysis engine 415; an emergency assessment engine 420; a tow truck dispatch system interface/portal 430; an interactive voice response (IVR) call flow logic 431 and a short-message-service/multi-media-message-service (SMS/MMS) module 433. Each one of the engines is operative to receive and process data from a respective one or more of the intrinsic and extrinsic data sources. Each of the engines is also operative to communicate with other engines using various libraries (i.e. application-programming-interfaces or APIs) 423 such that data and other information, such as decisions or determinations may be exchanged during data analysis and action determination. The emergency assessment engine 420 in conjunction with the tow truck dispatch system interface/portal 430 may serve as a central coordination point-of-action in some embodiments for all other engines executed by the one or more processors 401. The tow truck dispatch system interface/portal 430 may provide an SaaS application interface to the tow truck dispatch systems 170 via the GUI 125, and to the CAD workstations via GUI 143.

The IMU and vehicle data analysis engine 408 is operative to receive and process mobile device IMU data 201 from mobile devices that are physically present in a vehicle engaged in a collision or other roadside emergencies, as well as obtain connected vehicle data 203 from any connected vehicles involved in a collision. An IMU is an inertial measurement unit and may include a gyroscope, accelerometer and magnetometer. Both mobile devices and connected vehicles may include IMUs. The IMU and vehicle data analysis engine 408 is operative to determine that an emergency has occurred and to assess incident severity based on data indicating airbag deployment in a vehicle, an automatic crash notification, change-in-velocity, and acceleration data. The specific mobile devices and vehicles involved in a specific incident are determined in conjunction with the location determination engine 411, which resolves and associates mobile device IMU data 201 and connected vehicle data 203 with corresponding location information. The location information may be obtained from the location database 407 in some embodiments.

Both mobile devices and connected vehicles may send their respective location information, for example obtained using an internal global-position-system (GPS) chipset, over the Internet along with corresponding mobile device IMU data 201 and connected vehicle data 203. The AAR system 400 may therefore determine if multiple vehicles were involved in a collision by resolving location data (by the location determination engine 411) in conjunction with mobile device IMU data 201 and connected vehicle data 203 resolved by the IMU and vehicle data analysis engine 408.

Extrinsic data sources such as roadway camera data 205, traffic sensor data 207 and social media feeds 209 are obtained and assessed by the image analysis engine 409, traffic sensor data analysis engine 410 and social media context engine 413, respectively.

The image analysis engine 409 is operative to receive and process roadway camera data 205 and incorporates an artificial intelligence (AI) algorithm to visually determine when a collision has occurred. The image analysis engine 409 may receive continuous data feeds from various roadway cameras and may therefore analyze roadway camera data 205 substantially continuously. Because the location of each roadway camera is known, any collision detected will in turn send a notification to the emergency assessment engine 420 which will query the IMU and vehicle data analysis engine 408 for associated data analysis. Roadway cameras may be positioned to overlook a highway, parkway, expressway, or other major roadway and may be positioned to overlook side streets or blocks in neighborhood communities. Such roadway cameras may be owned and operated by federal, state, or local authorities. However, some roadway cameras may be personal surveillance cameras where the camera owner has authorized sharing information and surveillance camera data with state or local authorities.

The traffic sensor data analysis engine 410 is operative to receive and process traffic sensor data 207 and incorporates an artificial intelligence (AI) algorithm to review traffic patterns and determine when a collision has occurred. The traffic sensor data analysis engine 410 may receive continuous data feeds from various roadway traffic sensors and may therefore analyze roadway traffic sensor data 207 substantially continuously. Because the location of each roadway traffic sensor is known, any collision detected will in turn send a notification to the emergency assessment engine 420 which will query the IMU an vehicle data analysis engine 408 for associated data analysis.

The location determination engine 411 is operative to receive and process data from PSAPs 450 and in some embodiments may receive automatic number identification (ANI) and automatic location identifier (ALI) information in response to emergency calls received by the PSAPs 450. The location determination engine 411 may, in some embodiments, access the location database 407 and then either add missing location information or otherwise enhance location information corresponding to an ANI, and return the missing or enhanced location information to the PSAPs 450. The location determination engine 411 is operative to work in conjunction with the call cluster analysis engine in some embodiments.

For example, the location determination engine 411 may determine that locations for a group of emergency calls are within a given radius (such as a one-half mile radius or less such as a 300 meter radius) and notify the call cluster analysis engine 412. The emergency call cluster analysis engine 412 is operative to receive ANI information from the PSAPs 450 and determine that calls arriving in close time proximity (such as within two minutes of each other, for example), and within the given predetermined radius as determined by the location determination engine 411, indicate that the calls are related to the same incident.

The social media context engine 413 is operative to receive and process social media feeds 209 and incorporates an artificial intelligence (AI) algorithm to review the feeds for contextual information including, but not limited to, location related information. In some embodiments, the image analysis engine 409 may assess images posted in the social media feeds 209 when such images are available.

The tow truck dispatch system interface/portal 430 is operative to access various libraries (i.e. APIs) 423 such that it may communicate with the various tow truck dispatch systems 170 and provide information in an emergency tow truck dispatch GUI 125 displayed on a tow truck dispatch station 121 display or on a tow truck dispatch operator's mobile device. The tow truck dispatch system interface/portal 430 is also operative to receive a confirmation or acknowledgement from the tow truck dispatch systems 170, or via a mobile device, and to relay the confirmation or acknowledgment to the PSAPs 450 and to relay the confirmation or acknowledgment to a specific emergency incident.

A panic button analysis engine 415 is operative to receive and process data from mobile devices and connected vehicles that incorporate such a feature. This feature may be used in emergency and also in non-emergency situations. In an example of a non-emergency situation, a driver may send an alert to a PSAP by, for example, pushing a panic button on the vehicle console or a soft button on mobile phone app. The mobile phone app may include a further user query in which the user may indicates that it is not a life-threatening situation or is otherwise a non-emergency. The PSAP may convey this message as a query to the AAR system 400, which may in turn obtain location information based on ANI information contained in the query. However, if a phone call is placed to the PSAP, the driver may verbally convey the location. In either event, the PSAP may send a query to the AAR system 400 requesting a non-emergency tow truck. The tow truck dispatch system interface/portal 430 may then in response, send an alert message to the tow truck dispatch systems 170 to dispatch a tow truck. If a tow truck dispatch operator accepts the query, an acknowledgement confirmation is returned to the tow truck dispatch system interface/portal 430, which may in turn notify the originating PSAP. In some embodiments, the driver may be able to choose between tow truck providers based on the driver's insurance provider, response times and price, or both, using a mobile phone app that communicates with the tow truck dispatch system interface/portal 430.

The emergency assessment engine 420 is operative to receive analysis and determination data from the IMU and vehicle data analysis engine 408; the image analysis engine 409; the traffic sensor data analysis engine 410; the location determination engine 411; the emergency call cluster analysis engine 412; the social media context engine 413; and the panic button analysis engine 415, and to make a final determination as to incident severity and location. Based on the severity and location determination, the emergency assessment engine 420 is operative to utilize the tow truck dispatch system interface/portal 430 to request dispatch of one or more tow trucks to the location of the incident. The emergency assessment engine 420 is also operative to receive an acknowledgement and confirmation from the tow truck dispatch systems 170 and to notify the PSAPs 450 when the one or more tow trucks have been dispatched. The acknowledgment may be received by the emergency assessment engine 420, through the tow truck dispatch system interface/portal 430, via the SMS/MMS module 433 or via the IVR call flow logic 431. Tow truck dispatch operators may enter an acknowledgement using the GUI 125, sending a text message or responding to an IVR call flow logic 431 input prompt. Tow truck dispatch systems 170 that employ dispatch stations 121 may utilize the GUI 125 within a web browser to receive tow truck dispatch requests from the emergency assessment engine 420, and to enter acknowledgements within the GUI 125. Otherwise, tow truck dispatch operators may also access tow truck dispatch requests via text or multi-media messages sent to their respective mobile devices via the SMS/MMS module 433, or receive IVR calls on their mobile devices from the IVR call flow logic 431. In that case, the IVR call flow logic 431 provides user prompts for responding the tow truck dispatch request with a keypad or voice entry to indicate acknowledgement, such as "say yes, or press one to acknowledge," and "say no or press two to reject." The IVR call flow logic 431 and SMS/MMS module 433 are operatively coupled to the emergency assessment engine 420 and are both operative to convey the acknowledgment received from a tow truck dispatch operator.

One or more of the various engines described herein may be implemented as software or firmware (or as a combination of software and firmware) executing on one or more processors, and may also include, or may be implemented independently, using hardware such as, but not limited to, ASICs (application specific integrated circuits), DSPs (digital signal processors), hardwired circuitry (logic circuitry), or combinations thereof. That is, any of the engines and/or the tow truck dispatch interface/portal 430 may be implemented using an ASIC, DSP, executable instructions executing on a processor, logic circuitry, or combinations thereof. In other words, the engines may be implemented as hardware, software or by combinations thereof. Therefore, each of the engines disclosed herein may be considered a type of apparatus that may be implemented and operate independently from the other engines in the AAR system.

In the example of FIG. 4, the various engines and the tow truck dispatch interface/portal 430 are implemented as executable instructions (i.e. as portions of the executable instructions 421) stored in memory 402 which can be executed by one or more processors 401.

Figure 5:
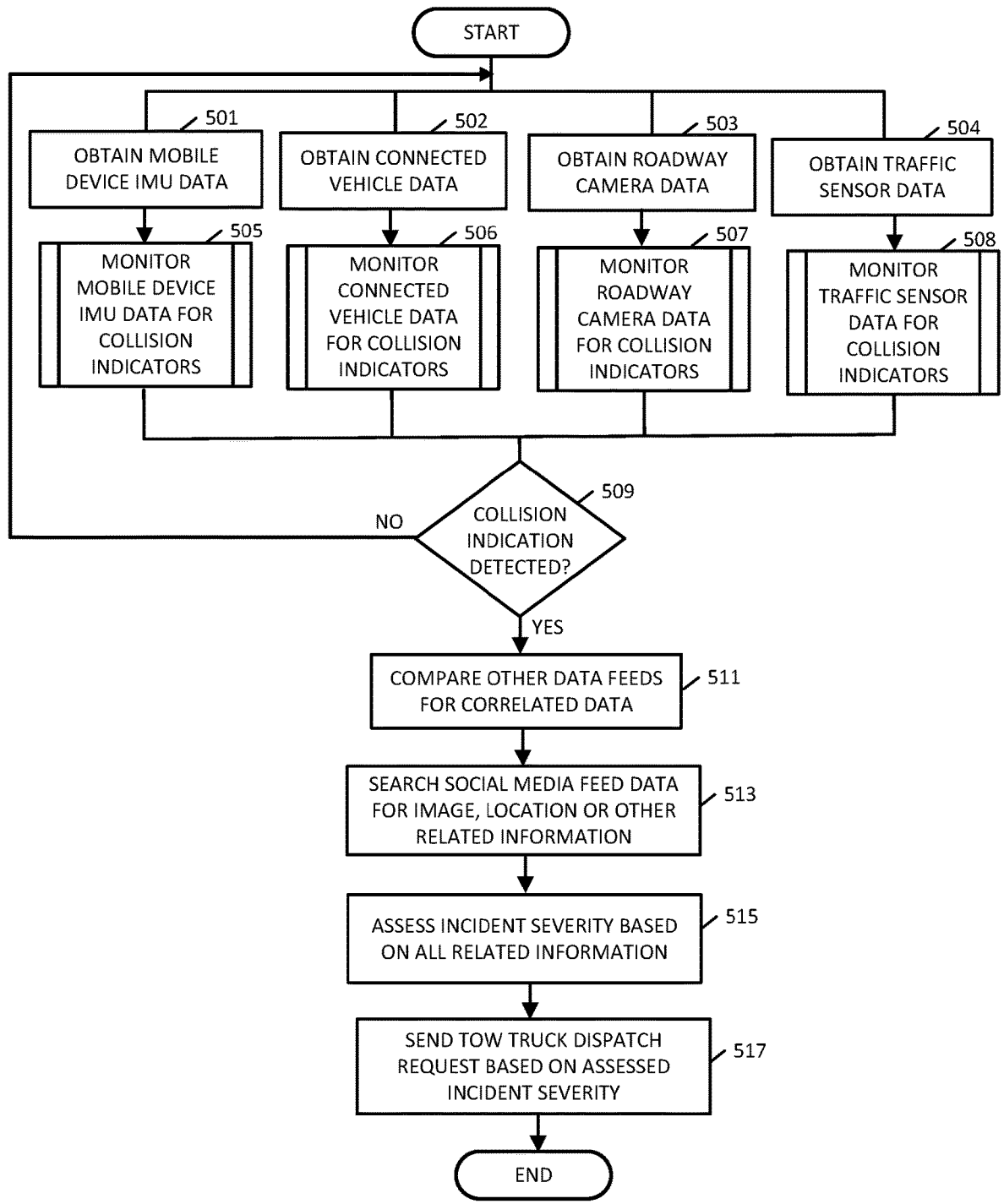
FIG. 5 is a flowchart showing a method of operation of the AAR system in accordance with various embodiments.

FIG. 5 is a flowchart showing a method of operation of the AAR system with respect to data source analysis for dispatching a tow truck in accordance with various embodiments. The method of operation begins, and in operation blocks 501 through 504, AAR system 400 obtains data from the various data sources 200 illustrated in FIG. 2 and FIG. 4. For example, in operation block 501, the AAR system 400 obtains mobile device IMU data, and in operation block 505 monitors the mobile device IMU data for collision indicators. In operation block 502, the AAR system 400 obtains connected vehicle data, and in operation block 506 monitors the connected vehicle data for collision indicators. In operation block 503 the AAR system 400 obtains roadway camera data, and in operation block 507 monitors the roadway camera data for collision indicators. In operation block 504, the AAR system 400 obtains traffic sensor data, and in operation block 508 monitors the traffic sensor data for collision indicators.

The processes in operation blocks 501 through 508 may occur continuously in some embodiments. In other embodiments, the data obtained in operation block 501 may only be received at initiation of emergency call. In some embodiments, the data obtained in operation block 502 may only be sent by connected vehicle when the connected vehicle determines that a collision has occurred. Therefore, in such embodiments, the receipt of the connected vehicle data in operation block 502 is sufficient to indicate that a collision has occurred without analysis. Further in that case, the connected vehicle data may be analyzed by the AAR system 400 to determine collision severity in some embodiments.

In decision block 509, the AAR system 400 determines if a collision indication was detected from any of the monitored data sources. A collision indication is detected in decision block 509 if at least one collision indicator is received in operation block 505, operation block 506, operation block 507, operation block 508. However a machine learning algorithm in the emergency assessment engine 420 makes a decision of whether a collision has occurred based on the received collision indicators. The machine learning algorithm is trained using data that is initially collected using the same monitoring systems. In some situations, a single collision indicator may be insufficient for the machine learning algorithm to concludes that a collision has in fact occurred. In other words, more than one collision indicator received will provide higher reliability of decision making by the emergency assessment engine 420. If no collision indication is detected in decision block 509, the process continues to obtain and monitor data from the various data sources 200. However, if a collision indication is detected in decision block 509, the method of operation proceeds to operation block 511 and checks and compares all the data source 200 feeds to determine if any incoming data may be correlated with the detected collision indication. A data correlation check may be performed by the emergency assessment engine 420 in some embodiments. The emergency assessment engine 420 uses the various libraries 423 to communicate with the other various engines executed by the one or more processors 401 to make the data comparison and correlation determination.

In operation block 513, in response to the detected collision indication in decision block 509, the social media context engine 413 will search social media data for image, location, or other related information that may be correlated to the detected collision. In operation block 515, the emergency assessment engine 420 will assess the incident severity based on all related and correlated information received from the various engines including the social media context engine 413. In operation block 517, emergency assessment engine 420 will access appropriate libraries 423 and communicate with the tow truck dispatch system interface/portal 430 to send a tow truck dispatch request to the tow truck dispatch systems 170 based on the assessed incident severity. The method of operation then ends as shown.

Figure 6:
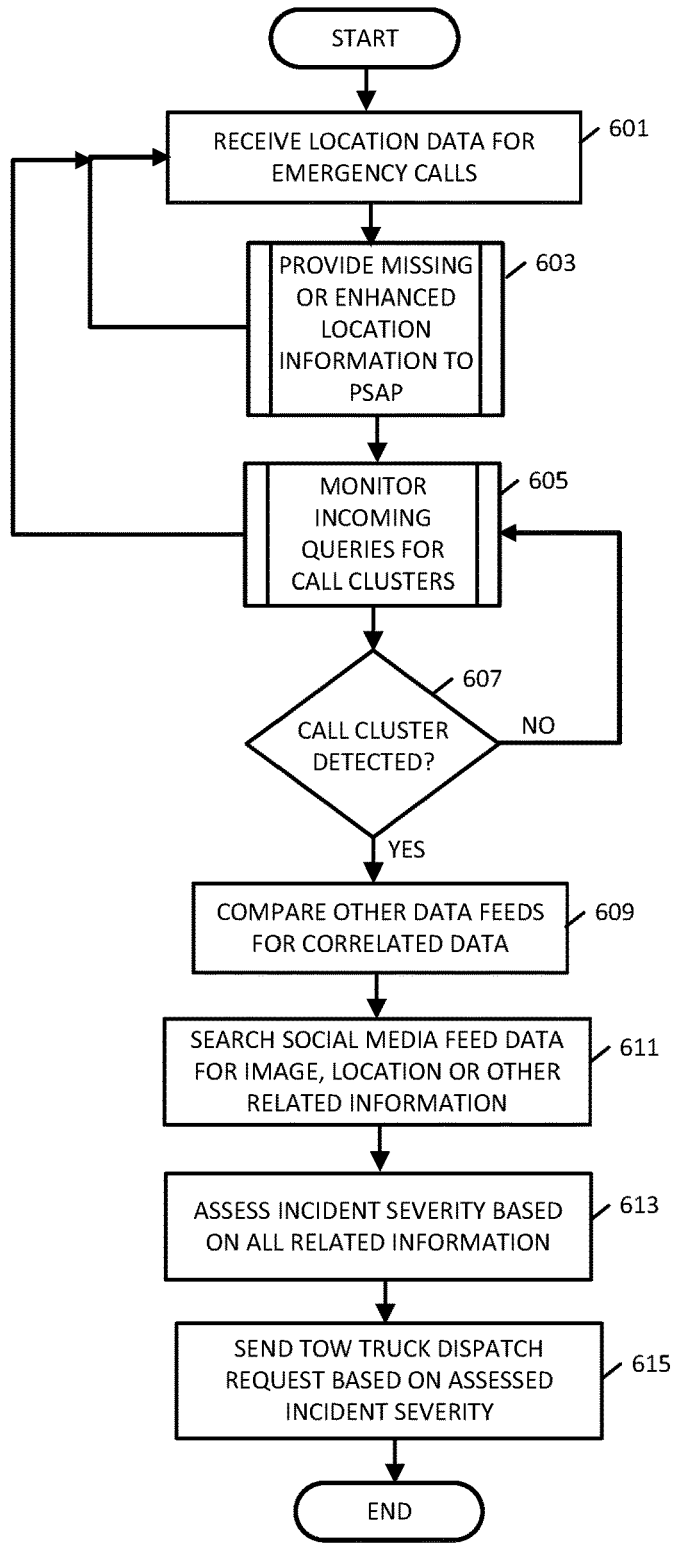
FIG. 6 is a flowchart showing a method of operation of the AAR system in accordance with various embodiments.

FIG. 6 is a flowchart showing another method of operation of the AAR system related to call cluster analysis for dispatching a tow truck in accordance with various embodiments. The method of operation begins, and in operation block 601, the AAR system 400 receives mobile device location data for received emergency calls which may be received by a PSAP. The location data may be, for example, Android™ Emergency Location Service (ELS) or Advance Mobile Location (AML) data. The location data may be stored in the location database 407 and accessed by the location determination engine 411. The location determination engine 411 accesses the location database 407 and in operation block 603 provides a PSAP with either missing location information or enhanced location information depending on the level of location information available to the PSAP via its ALI/ANI (Automatic Location Identification/Automatic Number Identification) data connection. In some cases, additional location information may also be provided to a PSAP in response to location queries. However, missing or enhanced location information via ELS or AML data is provided continuously in operation block 603 as part of normal operation of the AAR system 400.

As ELS or AML location data arrives in operation block 601 the AAR system 400 also monitors the data in operation block 605 to determine if the emergency calls form call clusters based on the proximity of the caller locations and the timing of the calls. For example, calls located within a 300 m radius and arriving within 2 to 5 minutes of each other may be considered a call cluster and therefore may be considered related to an identical emergency incident. Thus, in decision block 607 the call cluster analysis engine 412 may determine that a call cluster has been detected. If no call cluster is detected in decision block 607, then the method of operation proceeds to monitor incoming location queries for call clusters in operation block 605. However, if a call cluster is detected in decision block 607, then the method of operation proceeds to operation block 609 and accesses and compares data feeds from all other data sources 200 to look for correlated data. Further, in operation block 611, the social media context engine 413 searches social media data for images, location information or other related information that may be correlated to the incident. In operation block 613, the emergency assessment engine 420 assesses the incident severity based on all related information. In operation block 615, the emergency assessment engine 420 communicates with the tow truck dispatch system interface/portal 430 to send a tow truck dispatch request based on the assessed incident severity, and may also send an SMS message or place an IVR call to some dispatchers based on their respective preferences or technical capabilities. The method of operation then ends as shown.

Figure 7:
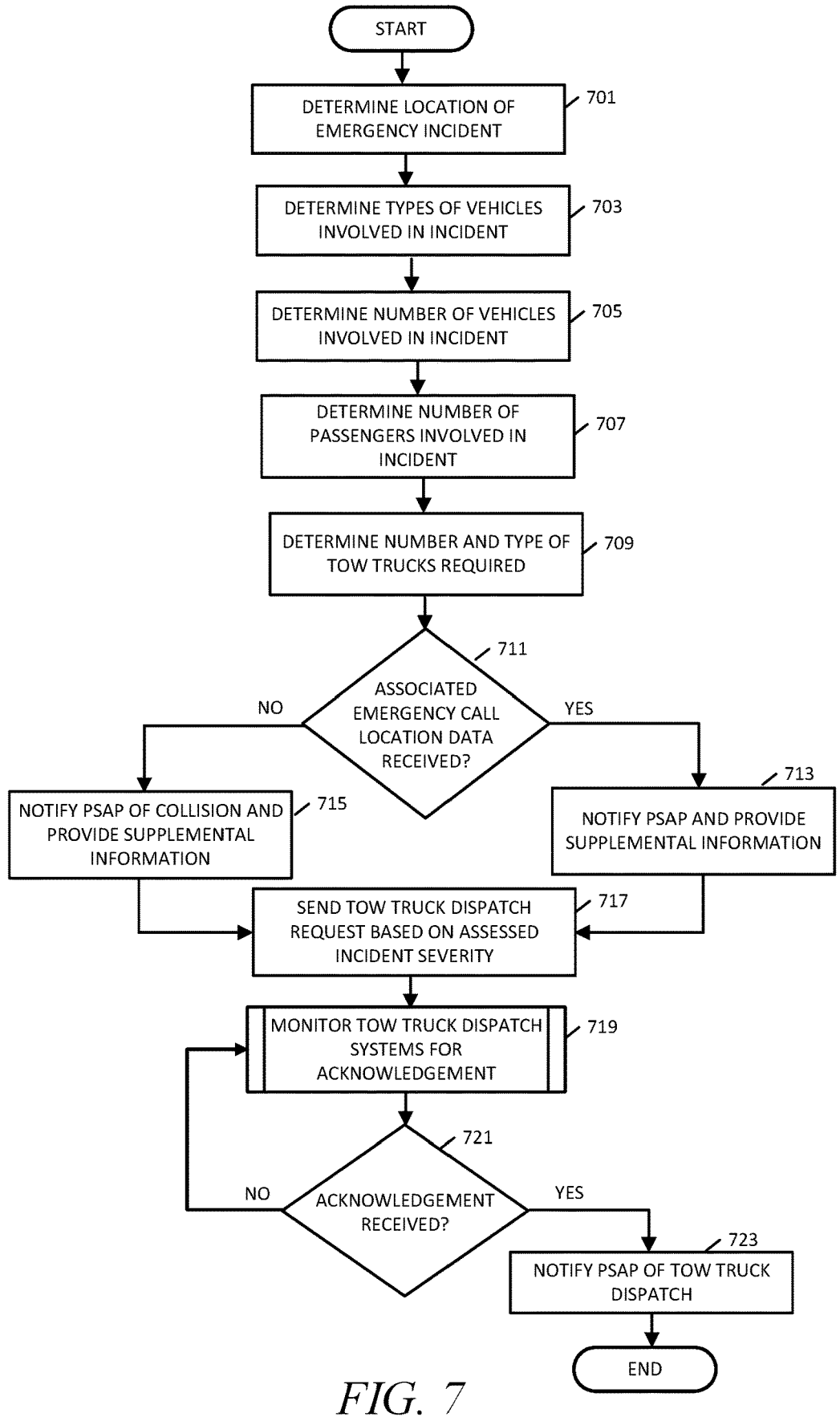
FIG. 7 is a flowchart showing a method of operation of the AAR system related to emergency tow truck dispatching in accordance with various embodiments.

FIG. 7 is a flowchart showing a method of operation of the AAR system related to tow truck dispatching in accordance with various embodiments. The method of operation begins, and in operation block 701 location determination engine 411 determines the location of emergency incident. The location may be determined using GPS data obtained from a mobile device or from the connected vehicle that incorporates a GPS chipset. However, in other situations, the location may be determined by accessing the location database 407 in conjunction with ANI information that may be received by the AAR system 400 from a PSAP. The data source mobile device IMU data 201 may include location information such as that provided by a GPS chipset or other location information and identification information that identifies the mobile device sending the IMU data such that ANI/ALI data is not required from the PSAP.

In operation block 703, AAR system 400 may determine the types of vehicles involved in an incident. For example, if connected vehicle data 203 is received by the IMU and vehicle data analysis engine 408, the connected vehicle data 203 may indicate the type of vehicle. In operation block 705, the emergency assessment engine 420 determines the number of vehicles involved in the incident. This is accomplished by the step in which the emergency assessment engine 420 looks for correlated data. The call cluster analysis engine 412 may determine a number of related calls which may also be useful in correlating connected vehicle data 203 and/or mobile device IMU data 201 to the various involved vehicles.

Similarly, in operation block 707, the number of passengers involved in the incident may also be determined by the correlation of data where a number of mobile devices having the same location provide mobile device IMU data 201 to the AAR system 400. Additionally, connected vehicle data 203 may provide an indication of the number of passengers in each vehicle. In operation block 709, emergency assessment engine 420 determines the number and type of tow trucks required based on the number of vehicles, the vehicle types if the information is available, and possibly the incident severity.

All of the above operations in accordance with the various embodiments may be performed without receipt of an emergency call by the PSAP and without a query being received by the AAR system 400 from the PSAP. However, in some emergency situations emergency calls may be received subsequent to the AAR system 400 having made the determination that a collision has occurred and that an emergency situation exists. Therefore, in decision block 711, the emergency assessment engine 420 will determine if any related and correlated location data such as ELS or AML data have been received by the location determination engine 411. If no associated emergency call location data has been received at decision block 711, then the emergency assessment engine 420 will proceed to operation block 715 and will notify the correct PSAP of the collision and provide any available supplemental information. The correct PSAP is determined based on the location of the incident and the geographic coverage area defined for the specific PSAP. In other words, each PSAP has a defined geographic coverage area which is known to the AAR system 400 such that the AAR system 400 may accordingly notify the correct PSAP.

If in decision block 711 associated location data has been received by the AAR system 400, then in operation block 713 the emergency assessment engine 420 will also notify the correct PSAP and provide any available supplemental information. In either case, in operation block 717 the emergency assessment engine 420 communicates with the tow truck dispatch system interface/portal 430 to send a tow truck dispatch request based on the assessed incident severity and all available information. In operation block 719, the emergency assessment engine 420 monitors the tow truck dispatch systems 170 and waits for an acknowledgment. Until an acknowledgment is received in decision block 721, the process in operation block 719 continues. When an acknowledgment has been received at decision block 721, emergency assessment engine 420 will proceed to operation block 723 and notify the correct PSAP that the one or more tow trucks has been dispatched to the scene of the incident. The method of operation then ends as shown.

Figure 8:
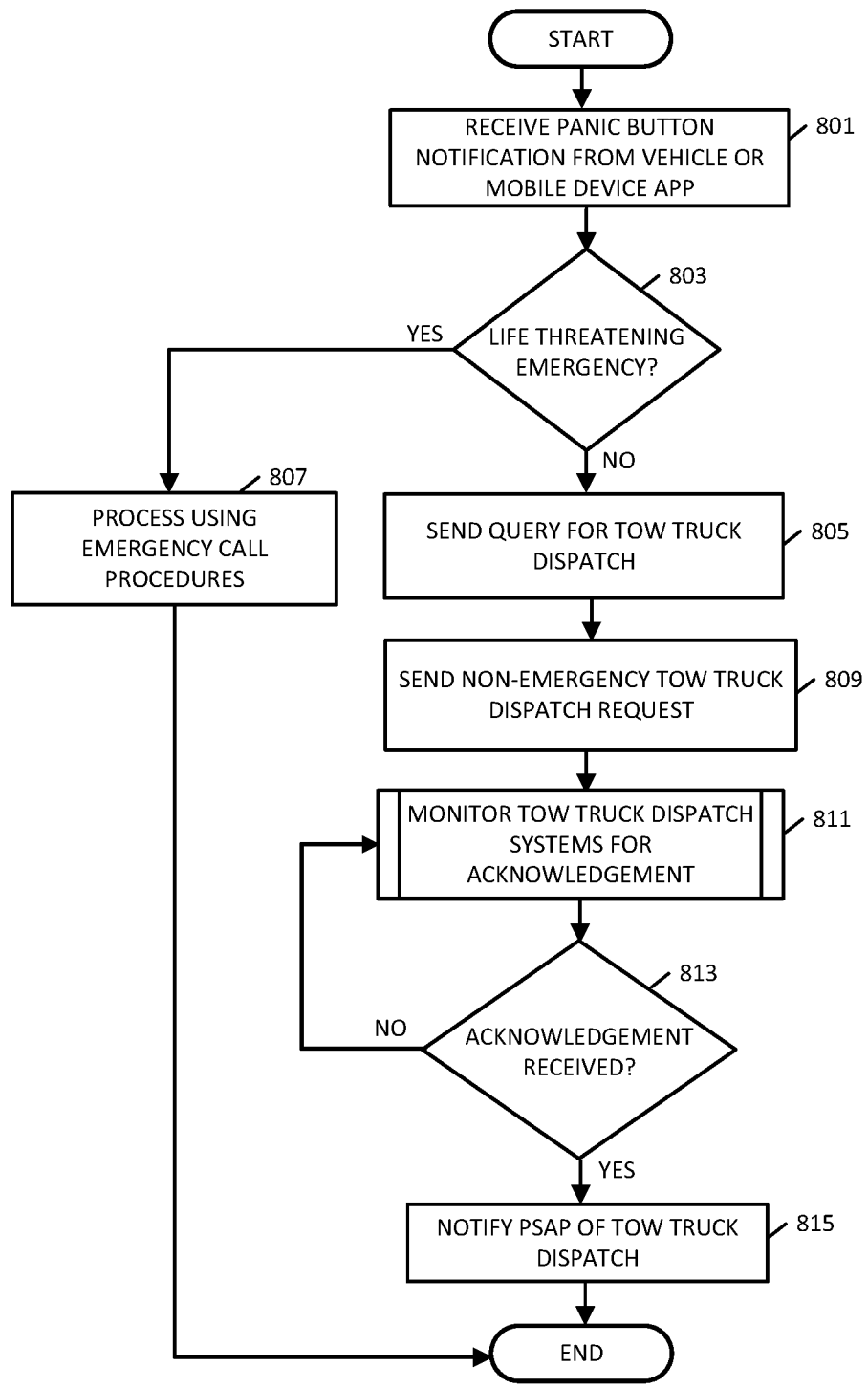
FIG. 8 is a flowchart showing a method of operation of the AAR system related to non-emergency tow truck dispatching in accordance with various embodiments.

FIG. 8 is a flowchart showing a method of operation of the AAR system related to non-emergency tow truck dispatching. The method of operation begins and in operation block 801, a PSAP receives a panic button notification either from the vehicle dashboard or from a mobile device application. Depending on the severity of the situation, in some cases the user may be able to verbally communicate with the PSAP operator or the services facility that provides the in-vehicle panic button notification service, and convey the nature of the incident whether it is life-threatening emergency. In other cases where there is no verbal communication, or supplemental to verbal communication, the AAR system 400 may utilize the various data sources 200 to determine incident severity. In any of the situations, in decision block 803, a determination is made as to whether the incident is life-threatening emergency. The life-threatening emergencies determine decision block 803, then the method of operation proceeds to operation block 807 and the notification is processed using emergency call procedures such as those described with respect to previous flowcharts.

However, if the situation is determined to be a non-emergency at decision block 803, then the method of operation proceeds to operation block 805, and a query for tow truck dispatch is sent. In some embodiments, the CAD dispatch system 140 will display the tow truck dispatch emergency services application GUI 143 the operator may then send the query for tow truck dispatch using the GUI 143. The GUI 143 communicates with the AAR system and specifically with the tow truck dispatch system interface/portal 430. In such embodiments, in response to receiving the tow truck dispatch query from the GUI 143, the tow truck dispatch system interface/portal 430 performs the action of operation block 809 and forwards the query to the tow truck dispatch systems 170 for a non-emergency tow truck.

In alternative embodiments, the tow truck dispatch services application and the associated GUI 143 includes the tow truck dispatch system interface/portal 430 executing on the CAD dispatch system 140. In that case, the CAD dispatch system 140 interacts with the tow truck dispatch systems 170 directly and will directly receive an acknowledgment from the responding dispatch operator. The acknowledgment will appear in the GUI 143. Therefore, in the flowchart of FIG. 8, depending upon the particular embodiment, the operation of operation block 809 and operation block 811 may be performed either by a tow truck dispatch system interface/portal 430 and AAR system, or via a tow truck dispatch system interface/portal 430 that is present in the CAD dispatch system 140. In either embodiment, monitoring will continue in operation block 811 until an acknowledgment is received at decision block 813. Once an acknowledgment is received at decision block 813, in operation block 815 a notification will be sent to the PSAP either from the tow truck dispatch system interface/portal 430 at the AAR system, or directly from one of the tow truck dispatch systems 170 in embodiments in which the tow truck dispatch system interface/portal 430 is present in the CAD dispatch system 140. The method of operation then ends as shown.

Figure 9:
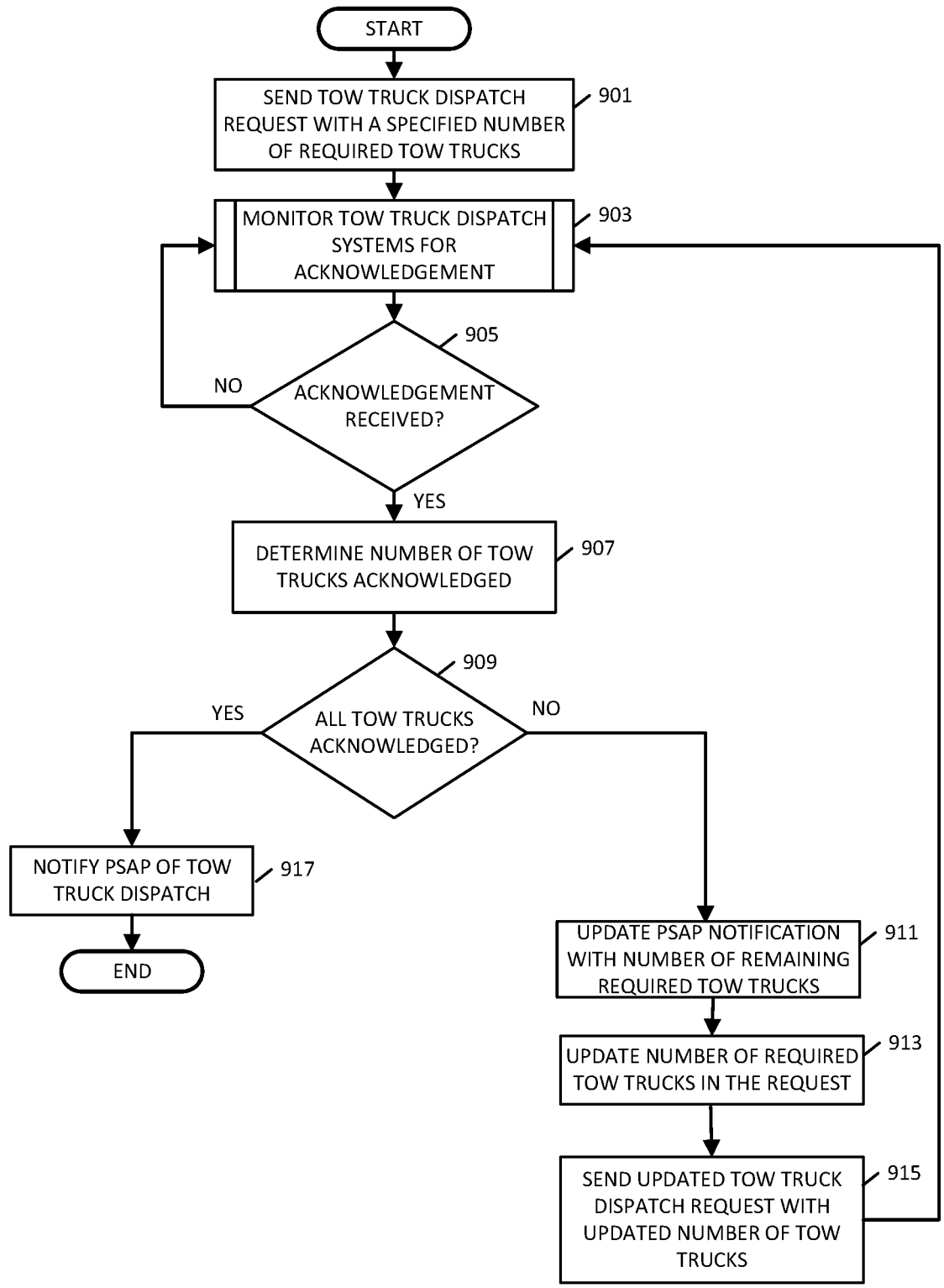
FIG. 9 is a flowchart showing a method of operation of the AAR system in accordance with various embodiments.

FIG. 9 is a flowchart showing a method of operation of the AAR system 400 related to tow truck dispatch query acknowledgements for emergencies where multiple tow trucks are required at an accident scene. The method of operation begins, and in operation block 901, the emergency assessment engine 420 communicates with the tow truck dispatch system interface/portal 430 to send a tow truck dispatch request with a specified number of tow trucks required at an emergency location. The tow truck dispatch request may also be sent as an SMS message or as an IVR call to a dispatch operator. In operation block 903, the emergency assessment engine 420 monitors the tow truck dispatch systems 170 and waits for an acknowledgement. Depending on each tow truck dispatcher's demand and the number of tow trucks required, some tow truck dispatchers may not be able to dispatch all needed tow trucks because they may not have the sufficient tow trucks available. In that case, an updated dispatch request may be sent such that another tow truck dispatcher may provide acknowledgements. Returning to the method of operation, until an acknowledgement is received in decision block 905, the process in operation block 903 continues and the tow truck dispatch systems 170 are monitored for an acknowledgement. If an acknowledgement is received in decision block 905, then the emergency assessment engine 420 will proceed to operation block 907 to determine a number of tow trucks acknowledged by the tow truck dispatch systems 170. In other words, the particular tow truck dispatcher sending the acknowledgment may only be able to accommodate a portion of the required tow trucks.

If in decision block 909 the emergency assessment engine 420 determines that all tow trucks have been acknowledged, then in operation block 917 the emergency assessment engine 420 will notify the appropriate PSAP that all tow trucks have been dispatched to the scene of the incident. However, if in decision block 909 the emergency assessment engine 420 determines that the acknowledgment only acknowledges dispatch of a portion of the requested tow trucks, then the emergency assessment engine 420 will proceed to operation block 911 and the emergency assessment engine 420 will notify the PSAP of the remaining number of required tow trucks that have not been dispatched or otherwise update the PSAP with the number of tow trucks that have been dispatched. The emergency assessment engine 420 then proceeds to operation block 913 and updates the tow truck dispatch request with the remaining number of required tow trucks. In operation block 915, the emergency assessment engine 420 communicates with the tow truck dispatch system interface/portal 430 to send the updated tow truck dispatch request. The emergency assessment engine 420 then proceeds to operation block 903 to monitor the tow truck dispatch systems 170 and wait for an acknowledgement for the updated tow truck dispatch request. When the emergency assessment engine 420 determines that all required tow trucks have been acknowledged for dispatch in operation block 909, then in operation block 917 the emergency assessment engine 420 will notify the appropriate PSAP that all tow trucks have been dispatched to the scene of the incident. The method of operation then ends as shown.

Figure 10:
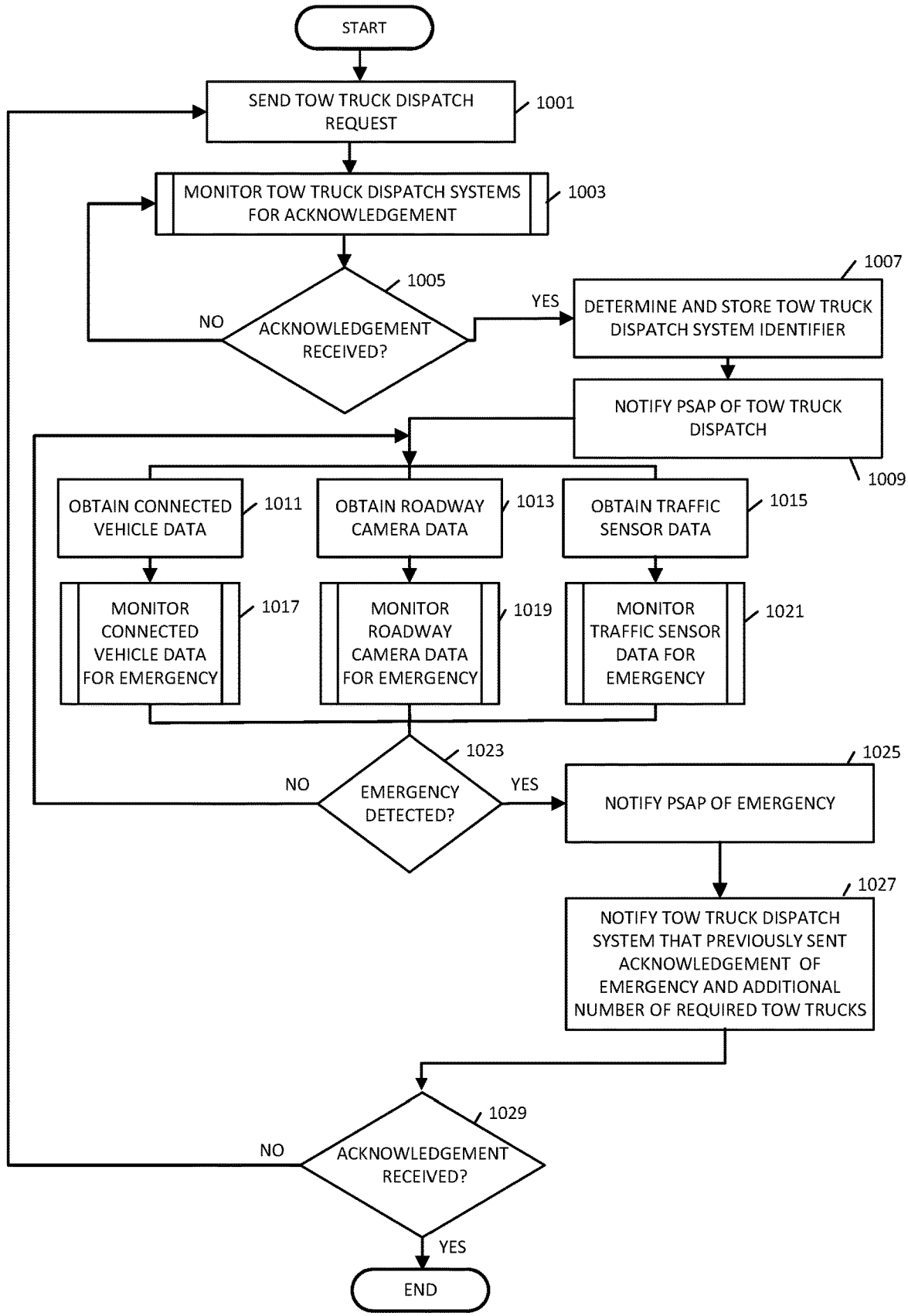
FIG. 10 is a flowchart showing a method of operation of the AAR system in accordance with various embodiments.

FIG. 10 is a flowchart showing a method of operation of the AAR system 400 related to tow truck dispatch requests and situational awareness of vehicle collision events in which the AAR system 400 monitors an emergency scene during tow truck dispatching. Emergencies may be detected that occur subsequent to the occurrence of another emergency in which a tow truck dispatch request was previously sent. The method of operation illustrated by FIG. 10 monitors a situation, i.e. obtains "situation awareness" of an existing accident or emergency scene and updates the tow truck dispatch request, or sends a new additional request if needed. For example, if a vehicle crash results in a pile-up, and more vehicles become involved during monitoring, the number of required tow trucks is assessed by the AAR system 400 and additional tow truck resources are requested automatically if determined to be required. The method of operation begins, and in operation block 1001, the emergency assessment engine 420 communicates with the tow truck dispatch system interface/portal 430 to send a tow truck dispatch request. In operation block 1003, the emergency assessment engine 420 monitors the tow truck dispatch systems 170 and waits for an acknowledgement. Until an acknowledgement is received in decision block 1005, the process in operation block 1003 continues, and the emergency assessment engine 420 continues to wait for an acknowledgement. If an acknowledgement is received in decision block 1005, then in operation block 1007 the emergency assessment engine 420 will determine, and store in memory 402, a tow truck dispatch system identifier associated with the particular tow truck dispatch system that acknowledged a previously sent tow truck dispatch request, for example in one of the process flows shown in FIG. 7 through FIG. 9. In some implementations, the acknowledgement received in the process flows of FIG. 7 through FIG. 10 may include identification information for the tow truck dispatch system. Otherwise, the emergency assessment engine 420 will assign an identifier for each tow truck dispatch system that sends an acknowledgment. The tow truck dispatch system identifier may be, for example, a key or tag which may be unique to each tow truck dispatch system that may send an acknowledgment. In operation block 1009, the emergency assessment engine 420 notifies the appropriate PSAP of the tow truck dispatch to the scene of the incident. The appropriate PSAP is the PSAP serving the geographic area in which the incident has occurred.

In operation blocks 1011 through 1015 the AAR system 400 obtains data from the various data sources 200 illustrated in FIG. 2 and FIG. 4. For example, in operation block 1011, the AAR system 400 obtains connected vehicle data, and in operation block 1017 monitors the connected vehicle data for an associated emergency. In operation block 1013, the AAR system 400 obtains roadway camera data, and in operation block 1019 monitors the roadway camera data for an associated emergency. In operation block 1015, the AAR system 400 obtains traffic sensor data, and in operation block 1021 monitors the traffic sensor data for an associated emergency. The data from the various data sources 200 is used by the AAR system 400 to obtain situational awareness associated with or related to an emergency such as a vehicle collision.

The processes in operation blocks 1011 through 1021 may occur continuously. However, in some implementations, the data obtained in operation block 1011 may only be sent by a connected vehicle when the connected vehicle collision detection system determines that a collision has occurred. Connected vehicle collision detection systems may include a processor and various sensors such as one or more IMU sensors and other sensors that can detect vehicle impact and position used by the processor to determine if a collision has occurred or some other incident in which the vehicle has gone off-road such as if the vehicle slides into a roadside ditch due to icy road conditions, etc. The vehicle collision detection system includes wireless transceivers such that it may send data to the AAR system 400 via a wireless Internet connection. When such vehicle collision detection systems are present in a vehicle, the vehicle data obtained in operation block 1011 includes a collision indicator such that analysis of the data is not required in order to determine that a collision has occurred. However, some vehicles may only send sensor data, such as IMU data etc. and, in that case, the IMU and vehicle data analysis engine 408 is operative to analyze the incoming data to determine whether the vehicle is involved in a collision.

Thus, based on the monitored incoming data, in decision block 1023, the AAR system 400 determines if an emergency has been detected based on data from any of the monitored data sources. Detected emergencies may include for example, a vehicle collision, a vehicle that has gone off road, such as due to icy conditions, a vehicle fire, a situation requiring police, etc.

If an emergency is not detected in decision block 1023, then the process continues to obtain and monitor data from the various data sources 200. However, if an emergency is detected in decision block 1023, then in operation block 1025 the emergency assessment engine 420 notifies the appropriate PSAP of the emergency. In operation block 1027, the emergency assessment engine 420 identifies the tow truck dispatch system that previously sent an acknowledgment using the identifier stored in memory 402 in operation block 1007, and sends that tow truck dispatch system an updated tow truck dispatch request. In other words, the tow truck dispatcher that initially responded is given a right of first refusal to send additional required tow trucks if they are available. In decision block 1029, the emergency assessment engine 420 waits a predetermined period of time for another acknowledgement for the updated dispatch request sent in operation block 1027. If an acknowledgement is received in decision block 1029 within the predetermined time period, then the method of operation terminates as shown. If however, an acknowledgement is not received in decision block 1029 within the predetermined time period, then in operation block 1001 the AAR system 400 sends a new tow truck dispatch request to all tow truck dispatch systems 170.

As described above, the various embodiments make use of collision indicators. Collision indicators are derived from the various data sources 200 and provide a high probability indication that a vehicle collision has occurred. Each of the various data sources 200 provides specific types of collision indicators. For example, the mobile device IMU data 201 collision indicators are derived from sudden changes in direction, abrupt or sudden changes in acceleration or velocity, or sudden changes in position as determined by gyroscopic components of the data. The connected vehicle data 203 may also include such data and may include other data such as ultrafast pressure sensors, indications of airbag deployment and other data that may indicate damage to a vehicle among other things.

Roadway camera data 205 provides collision indicators as determined by the image analysis engine 409 which uses visual image processing to determine proximity of detected vehicles, as well as to detect changes in direction, velocity and acceleration. Traffic sensor data 207 is analyzed for anomalous activity indicating the presence of multiple vehicles in a given area. For example, traffic sensor data 207 may indicate that a number of vehicles entered a given area but did not traverse through based on subsequently positioned traffic sensors along the roadway not detecting the continuing travel of all vehicles. Therefore, the term "collision indicator" as used herein refers to any data that may indicate that a collision involving a vehicle either contacting another vehicle or another object or living being has occurred.

The term "severity" as used herein refers to the number of vehicles determined to be involved in the incident, the magnitude of the impact which may be determined by various collision indicators (specifically connected vehicle data 203 and mobile device IMU data 201), the number of passengers involved, whether pedestrians were involved, and possible other information. More particularly, high impact collisions as indicated by a given level of acceleration, velocity, direction of travel, or position change can be determined and assigned the level of severity. A severity level may be assigned based on the magnitude of the impact, for example, among other information, and the severity level may be conveyed to the corresponding PSAP.

Figure 11:
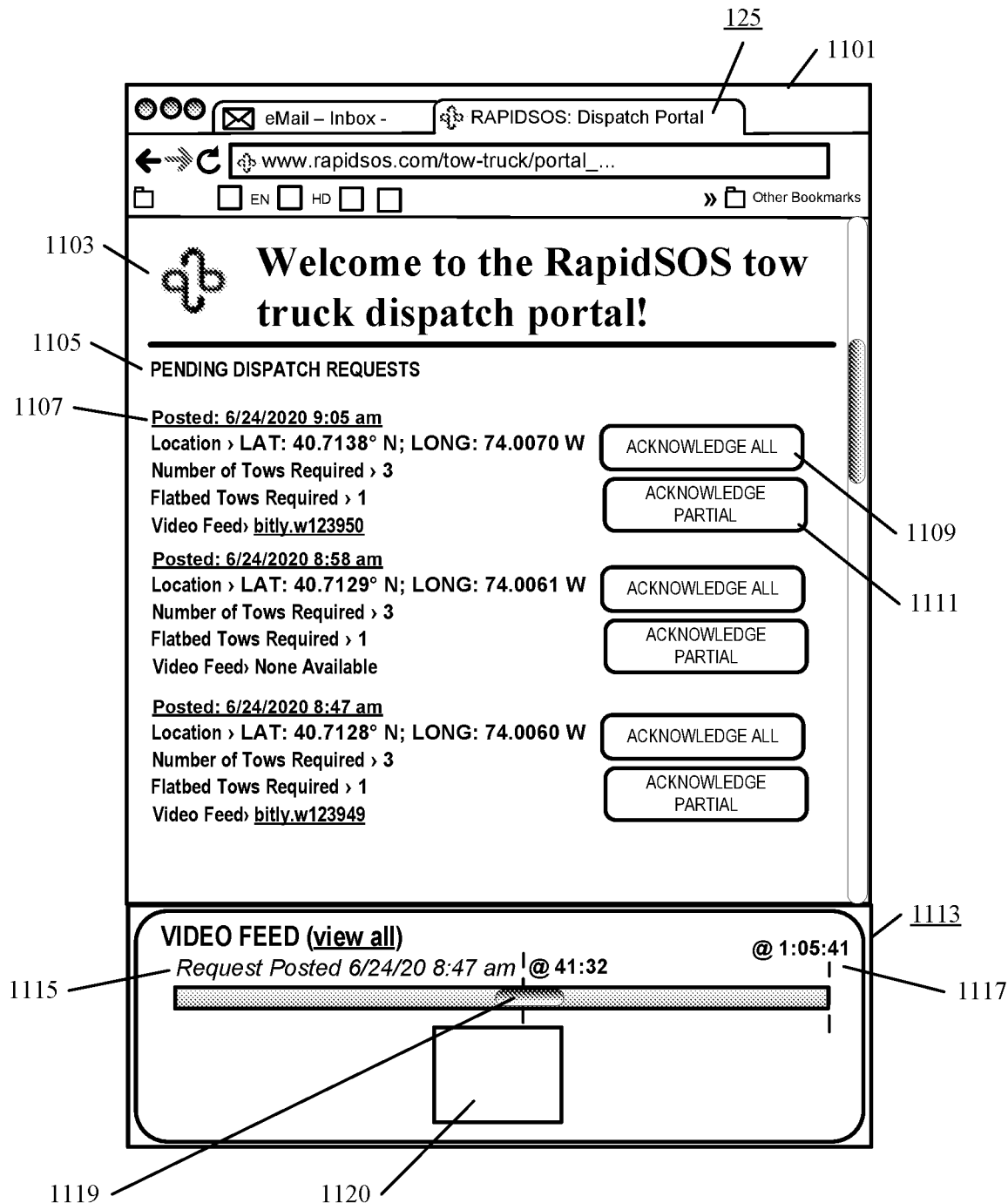
FIG. 11 is a diagram of a graphical user interface provided by the tow truck dispatch system interface/portal 430 in accordance with various embodiments.

FIG. 11 is a diagram of a graphical user interface provided by the tow truck dispatch system interface/portal 430 in accordance with various embodiments. The example graphical user interface (GUI) is one example of the GUI 125 which may be displayed on a dispatch station 121 display or on a mobile device. The example GUI 125 is displayed using a web browser 1101 and provides a main webpage 1103 that has a pending dispatch requests field 1105. Each tow truck dispatch request 1107 may include a posted time and date, a location, a number of tow trucks required and whether flatbed tow trucks are required. The tow truck dispatch request 1107 may also include a video feed link when available. Selection of the video feed link may open a video feed window 1113 to display a video 1120, and which may also provide an information field 115 showing date and time posted, video duration 1117 and a scrollbar 1119 to move to certain segments of the video 1120.

Each tow truck dispatch request 1107 may also include an "acknowledge all" soft button 1109 and an "acknowledge partial" soft button 1111. Selection of the "acknowledge all" soft button 1109 sends an acknowledgement to the AAR system 400 that all required tow trucks for the tow truck dispatch request will be provided. Selection of the "acknowledge partial" soft button 1111 opens a dialogue box that enables the user to enter a number for the number of tow trucks that they are able to accommodate. A field in the dialogue box may also require the user to enter whether flatbeds are being provided if flatbeds are requested. The GUI 125 is updated occasionally by the tow truck dispatch system interface/portal 430 to add new tow truck dispatch requests and to remove those that have already been acknowledged or otherwise show an indication that the request has been acknowledged.

Figures 12, 13:
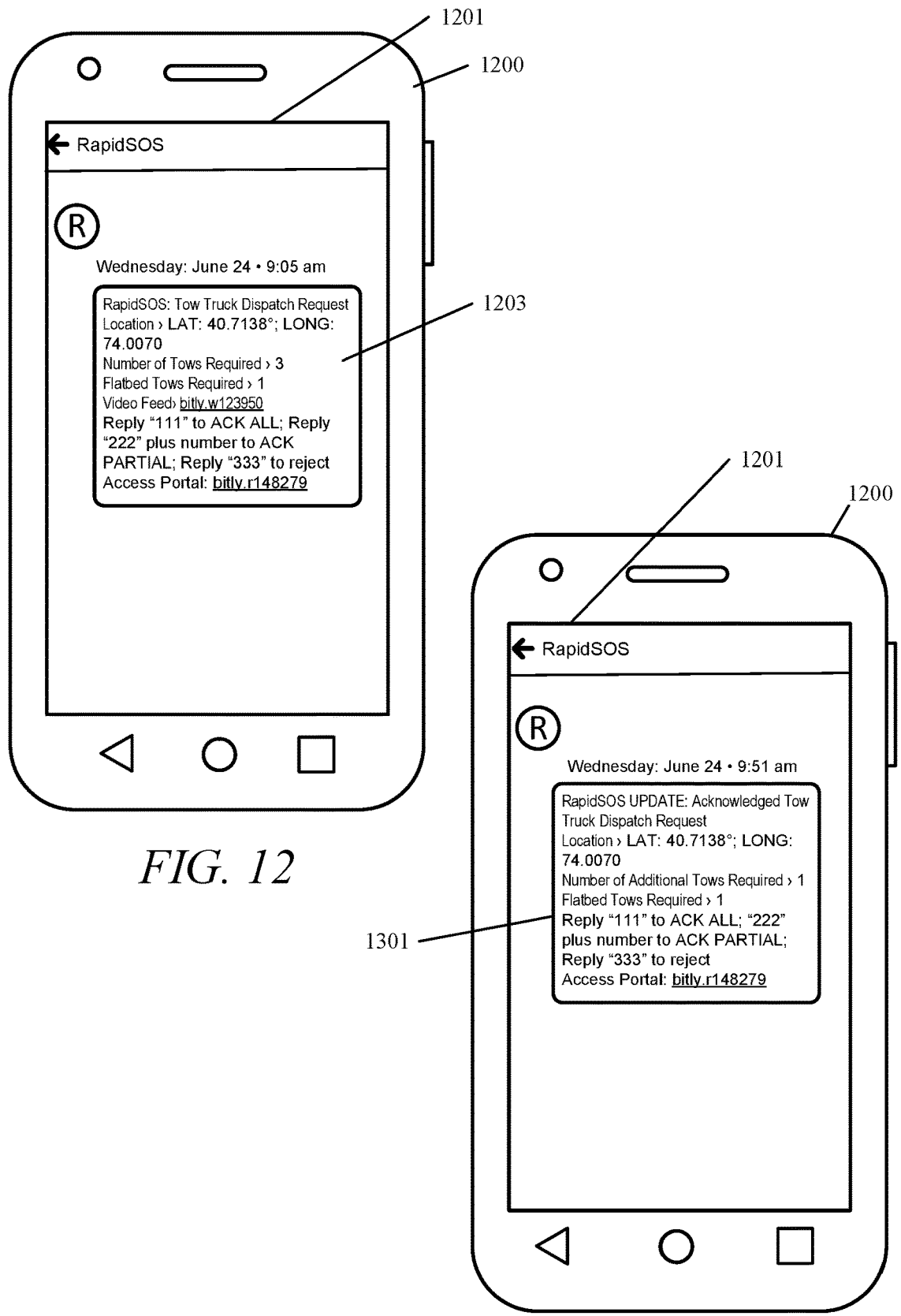
FIG. 12 is an example tow truck request send by the AAR system via SMS message in accordance with some embodiments.
FIG. 13 is an example of an updated tow truck request send by the AAR system via SMS message in accordance with some embodiments.

FIG. 12 is an example tow truck request send by the AAR system via SMS message in accordance with some embodiments. A mobile device 1200 may utilize an SMS message application 1201 to display a tow truck dispatch request text message 1203 sent by the SMS/MMS module 433. The operator may send an acknowledgement by replying to the text message. For example, replying with a "111" may correspond to an "acknowledge all," a "222" plus a number may correspond to an "acknowledge partial," and a "333" may reject the request.

FIG. 13 illustrates an updated tow truck request 1301 that may be sent in accordance with the method of operation illustrated by FIG. 10. The updated tow truck request 1301 may include a number of additional tow trucks required and allow the operator to "acknowledge all," "acknowledge partial," or "reject" the updated request. As discussed with respect to the process flow of FIG. 10, an updated tow truck request 1301 provides the acknowledging tow truck dispatcher a right-of-first-refusal opportunity to provide the additional required services. Thus in the case in which the operator rejects the updated tow truck request 1301 thereby giving up the right-of-first-refusal, the AAR system 400 would send out a new broadcast tow truck request to all tow truck dispatch systems 170 giving any dispatcher an opportunity to acknowledge and provide the requested services.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method of operating a cloud-server providing emergency service software-as-a-service applications to a plurality of emergency networks including public safety answering points (PSAPs), comprising:
   receiving, by the cloud-server, data from a plurality of data sources;
   determining that a vehicle collision occurred and that a tow truck is required based on the data;
   determining vehicle collision locations for a plurality of vehicle collisions for which a tow truck is required based on the data; and
      providing a software-as-a-service graphical user interface portal to a tow truck dispatch station computer system, displaying a plurality of pending dispatch requests, each dispatch request displayed in response to determining that a vehicle collision occurred for which a tow truck is required, each dispatch request displayed comprising a vehicle collision location and an acknowledgement input section operative to receive an acknowledgement input from a tow truck dispatch station computer system operator;
      receiving an operator input to the acknowledgement input section at at least one of the displayed dispatch requests; and
      providing the acknowledgement to a PSAP via a software-as-a-service graphical user interface portal displayed on a computer-aided-dispatch system located at the PSAP.

2. The method of claim 1, further comprising:
receiving, by the cloud server, location data for a plurality of emergency calls;
providing the location data to the PSAP in response to receiving the location data;
monitoring the location data for call clusters based on proximity and time; and
determining that a vehicle collision occurred based on determining that the emergency calls of a call cluster originated in proximity to a roadway.

3. The method of claim 1, further comprising:
receiving, by the cloud server, inertial measurement unit (IMU) data as a portion of the data received from the plurality of data sources;
determining that a vehicle collision occurred based on at least one of change in acceleration, change in velocity or change in position based on the IMU data; and
identifying the location of the IMU data source as the vehicle collision location.

4. The method of claim 1, further comprising:
receiving, by the cloud server, connected vehicle data as a portion of the data received from the plurality of data sources;
determining that a vehicle collision occurred based on at least one collision indicator included in the connected vehicle data; and
identifying the location of the connected vehicle as the location of the vehicle collision.

5. The method of claim 1, further comprising:
receiving, by the cloud server, traffic sensor data as a portion of the data received from the plurality of data sources;
determining that a vehicle collision occurred based on at least one collision indicator included in the traffic sensor data; and
identifying the location of the vehicle collision as the traffic sensor location.

6. The method of claim 1, further comprising:
receiving, by the cloud server, roadway camera data as a portion of the data received from the plurality of data sources;
determining that a vehicle collision occurred based on at least one collision indicator included in the roadway camera data; and
identifying the location of the vehicle collision as the roadway camera location.

7. The method of claim 1, further comprising:
determining at least one collision indicator based on data from one of the plurality of data sources;
comparing other data source data to identify correlated data; and
determining a severity level for a collision based on the at least one collision indicator and the correlated data.

8. The method of claim 1, further comprising:
searching social media feed data for related information in response to determining that a vehicle collision occurred based on the received data.

9. The method of claim 1, further comprising:
receiving an acknowledgment from a tow truck dispatch system in response to sending the tow truck dispatch request; and
notifying the PSAP via the software-as-a-service graphical user interface portal display on the computer-aided-dispatch system located at the PSAP that a tow truck has been dispatched to the vehicle collision location.

10. A cloud-server providing emergency service software-as-a-service applications to a plurality of emergency networks including public safety answering points (PSAPs), comprising:

an emergency assessment engine, operative to:
  receive data from a plurality of data sources;
  determine that a vehicle collision occurred and that a tow truck is required based on the data; and
a location determination engine, operatively coupled to the emergency assessment engine, operative to:
  determine vehicle collision locations for a plurality of vehicle collisions based on the data; and
provide a tow truck dispatch system interface operatively coupled to the location determination engine and to the emergency assessment engine operative to:
  provide a software-as-a-service graphical user interface portal to a tow truck dispatch station computer system, displaying a plurality of pending dispatch requests, each dispatch request displayed in response to the emergency assessment engine determining that a vehicle collision occurred for which a tow truck is required, each dispatch request displayed comprising a vehicle collision location and an acknowledgement input section operative to receive an acknowledgement input from a two truck dispatch station computer system operator;
  receive an operator input to the acknowledgement input section at at least one of the displayed dispatch requests; and
  provide the acknowledgement to a PSAP via a software-as-a-service graphical user interface portal displayed on a computer-aided-dispatch system located at the PSAP.

11. The cloud server of claim 10, further comprising:
a call cluster analysis engine, operatively coupled to the emergency assessment engine and to the location determination engine, the call cluster analysis engine operative to:
  monitor location data sent to the location determination engine for call clusters based on location proximity and time; and
  determine that a vehicle collision occurred based on determining that the calls of a call cluster originated in proximity to a roadway; and
wherein the location determination engine is further operative to:
  receive the location data for a plurality of emergency calls; and
  provide location information to the PSAP in response to receiving the location data.

12. The cloud server of claim 10, further comprising:
an inertial measurement unit (IMU) and vehicle data analysis engine, operatively coupled to the emergency assessment engine and to the location determination engine, the IMU and vehicle data analysis engine operative to:
  receive IMU data from a plurality of mobile devices and vehicles;
  determine that a vehicle collision occurred based on at least one of change in acceleration, change in velocity or change in position based on the IMU data; and
wherein the location determination engine is further operative to:
  identify the location of a mobile device that sent the IMU data as the vehicle collision location.

13. The cloud server of claim 12, wherein the IMU and vehicle data analysis engine is further operative to:
  receive connected vehicle data from a plurality of connected vehicles;
  determine that a vehicle collision occurred based on at least one collision indicator included in the connected vehicle data; and
wherein the location determination engine is further operative to:
  identify the location of the connected vehicle as the vehicle collision location.

14. The cloud server of claim 10, further comprising:
a traffic sensor data analysis engine, operatively coupled to the emergency assessment engine and to the location determination engine, the traffic sensor data analysis engine operative to:
  receive traffic sensor data from a plurality of traffic sensors;
  determine that a vehicle collision occurred based on at least one collision indicator included in the traffic sensor data; and
  identify the location of the vehicle collision as the traffic sensor location.

15. The cloud server of claim 10, further comprising:
an image analysis engine, operatively coupled to the emergency assessment engine and to the location determination engine, the image analysis engine operative to:
  receive roadway camera data from a plurality of roadway cameras;
  determine that a vehicle collision occurred based on at least one collision indicator included in the roadway camera data; and
  identify the location of the vehicle collision as the roadway camera location.

16. The cloud server of claim 10, wherein the emergency assessment engine is further operative to:
  determine at least one collision indicator based on data from one of the plurality of data sources;
  compare other data source data to identify correlated data; and
  determine a severity level for a vehicle collision based on the at least one collision indicator and the correlated data.

17. The cloud server of claim 10, further comprising:
a social media context engine, operatively coupled to the emergency assessment engine and to the location determination engine, the social media context engine operative to:
  search social media feed data for related information in response to determining that a vehicle collision occurred based on the received data.

18. The cloud server of claim 10, wherein
the software-as-a-service graphical user interface portal providing by the tow truck dispatch system interface is further operative to:
  notify the PSAP via the software-as-a-service graphical user interface portal display on the computer-aided-dispatch system located at the PSAP that a tow truck has been dispatched to the vehicle collision location.

19. A method of operating a cloud server providing emergency service software-as-a-service applications to a plurality of emergency networks including public safety answering points (PSAPs), comprising:
  determining that a vehicle collision occurred at a location based on data comprising connected vehicle data and mobile device inertial measurement unit data;
  sending a tow truck dispatch request to a plurality of tow truck dispatch systems via Internet Protocol connections, displaying the tow truck dispatch requests on a software-as-a-service graphical user interface portal at each of the tow truck dispatch systems, in response to determining that the vehicle collision occurred at the location, the request comprising the location and a specified number of tow trucks;

receiving an acknowledgment at the cloud-server from at least one of the tow truck dispatch systems in response to sending the tow truck dispatch request to the software-as-a-service graphical user interface portals; and notifying a PSAP that a tow truck has been dispatched to the location, the PSAP serving an area that includes the location.

20. The method of claim 19, further comprising:

determining that a required number of tow trucks are not acknowledged based on the specified number of tow trucks;

notifying the PSAP that a remaining number of tow trucks is still required; and sending an updated tow truck dispatch request with the remaining number of tow trucks.

* * * * *